United States Patent
Haglund et al.

(10) Patent No.: US 9,704,041 B2
(45) Date of Patent: Jul. 11, 2017

(54) METHOD AND SYSTEM FOR CLASSIFYING A TERRAIN TYPE IN AN AREA

(71) Applicant: Vricon Systems Aktiebolag, Linkoeping (SE)

(72) Inventors: Leif Haglund, Brokind (SE); Folke Isaksson, Linkoeping (SE); Per Carlbom, Linkoeping (SE); Ola Nygren, Linghem (SE); Johan Borg, Linkoeping (SE); Sanna Ringqvist, Linkoeping (SE); Anton Nordmark, Linkoeping (SE)

(73) Assignee: Vricon Systems Aktiebolag, Linkoeping (SE)

(*) Notice: Subject to any disclaimer, the term of this patent is extended or adjusted under 35 U.S.C. 154(b) by 0 days.

(21) Appl. No.: 15/150,943

(22) Filed: May 10, 2016

(65) Prior Publication Data

US 2016/0253545 A1    Sep. 1, 2016

Related U.S. Application Data

(63) Continuation of application No. 14/571,992, filed on Dec. 16, 2014, now Pat. No. 9,367,743.

(51) Int. Cl.
*G06K 9/00*    (2006.01)
*G06T 17/05*    (2011.01)
*G06T 7/507*    (2017.01)

(52) U.S. Cl.
CPC ............ *G06K 9/0063* (2013.01); *G06T 7/507* (2017.01); *G06T 17/05* (2013.01); *G06T 2207/10036* (2013.01); *G06T 2207/30181* (2013.01)

(58) Field of Classification Search
None
See application file for complete search history.

(56) References Cited

U.S. PATENT DOCUMENTS 9,367,743 B1    6/2016  Haglund et al.
2013/0004065 A1    1/2013  Ma
(Continued)

FOREIGN PATENT DOCUMENTS

WO    WO 2008/118977 A1    10/2008

OTHER PUBLICATIONS

Automated Water Extraction Index: A new technique for surface water mapping using Landsat imagery. Gudina L. Feyisa, Henrik Meilby, Rasmus Fensholt, Simon R. Proud. Apr. 2013.*
(Continued)

*Primary Examiner* — Delomia L Gilliard
(74) *Attorney, Agent, or Firm* — Alston & Bird LLP (57) ABSTRACT

A method for classifying a terrain type in an area is provided, which comprises the steps of obtaining a plurality of overlapping aerial images of the area, calculating at least one terrain type index for each part of each of the aerial images which lies in the area, where the at least one terrain type index represents the terrain type, determining at least one terrain type index for each part of the area based on the calculated at least one terrain type index for each part of each of the aerial images, and classifying the parts of the area for which at least one pre-determined conditions is met as containing the terrain type, wherein at least one of the at least one predetermined condition relates to a value of the determined at least one terrain type index. Also provided is a system and a computer program product.

19 Claims, 4 Drawing Sheets

(56) References Cited

U.S. PATENT DOCUMENTS

| | | | |
|---|---|---|---|
| 2014/0119639 A1* | 5/2014 | Shah | G06T 7/0081 382/154 |
| 2014/0212055 A1 | 7/2014 | Boriah et al. | |
| 2014/0257621 A1 | 9/2014 | Zych | |
| 2016/0171279 A1 | 6/2016 | Haglund et al. | |

OTHER PUBLICATIONS

An Adaptive Water Extraction Method from Remote Sensing Image Based on NDWI. Cheng Qiao & Jiancheng Luo & Yongwei Sheng & Zhanfeng Shen & Zhiwen Zhu & Dongping Ming. Oct. 2011.*

Automated Water Extraction Index: A new technique for surface water mapping using Landsat imagery. Gudina L. Feyisa, Henrik Meilby, Rasmus Fensholt , Simon R. Proud. Apr. 2013.

De Alwis, D. A., et al., "Unsupervised Classification of Saturated Areas Using a Time Series of Remotely Sensed Images", *Hydrology and Earth System Sciences Discussions*, 2007, pp. 1609-1620, vol. 4, No. 3, Copernicus Publications, U.S.A.

Descombes, X., et al., "Coastline Detection by a Markovian Segmentation on SAR Images", *Signal Processing*, 1996, pp. 126-132, vol. 55, Elsevier Science Publishers B.V., Amsterdam, NL.

European Patent Office, Extended European Search Report for Application No. 15150373.7, May 4, 2015, 9 pages, Germany.

Feyisa, Gudina L., et al., "Automated Water Extraction Index: A New Technique for Surface Water Mapping Using Landsat Imagery", *Remote Sensing of Environment*, Sep. 17, 2013, pp. 23-35, vol. 140, Elsevier Inc., U.S.A.

International Searching Authority, International Search Report and Written Opinion for International Application No. PCT/SE2015/051309, Apr. 11, 2016, 10 pages, Swedish Patent and Registration Office, Sweden.

Kouchi, Ken' Ichi, et al., "Characteristics of Tsunami-Affected Areas in Moderate-Resolution Satellite Images", *IEEE Transactions on Geoscience and Remote Sensing*, Jun. 2007, pp. 1650-1657, vol. 45, No. 6, IEEE, U.S.A.

Lu, Shanlong, et al., "Water Body Mapping Method with HJ-1A/B Satellite Imagery", *International Journal of Applied Earth Observation and Geoinformation*, Sep. 16, 2010, pp. 428-434, vol. 13, Elsevier, B.V., Netherlands.

Qiao, Cheng, et al., "An Adaptive Water Extraction Method from Remote Sensing Image Based on NDWI", *Journal of the Indian Society of Remote Sensing*, Oct. 15, 2011, pp. 421-433, vol. 40, No. 3, Springer-Verlag, India.

United States Patent and Trademark Office, Office Action for U.S. Appl. No. 14/571,992, Dec. 9, 2015, 15 pages, U.S.A.

United States Patent and Trademark Office, Notice of Allowance for U.S. Appl. No. 14/571,992, Feb. 23, 2016, 7 pages, U.S.A.

Benediktsson, Jon Atli, et al., "Decision Level Fusion of Multitype Data", *Geoscience and Remote Sensing Symposium*, Jun. 28, 1999, pp. 74-76, vol. 1, IEEE, U.S.A.

European Patent Office, Communication pursuant to Article 94(3) EPC for Application No. 15150373.7, Sep. 5, 2016, 6 pages, Netherlands.

European Patent Office, Result of Consultation Communication for Application No. 15150373.7, Oct. 13, 2016, 3 pages, Netherlands.

European Patent Office, Summons to Attend Oral Proceeding pursuant to Rule 115(1) EPC for Application No. 15150373.7, Feb. 23, 2017, 6 pages, Germany.

Gessner, Ursula, Et Al., "Estimating the fractional cover of growth forms and bare surface in savannas. A multi-resolution approach based on regression tree ensembles", *Remote Sensing Of Environment*, Nov. 28, 2012, pp. 90-102, vol. 129, Elsevier Inc.

\* cited by examiner

METHOD AND SYSTEM FOR CLASSIFYING A TERRAIN TYPE IN AN AREA

CROSS-REFERENCE TO RELATED APPLICATIONS

This application is a continuation of and claims priority to and the benefit of U.S. Utility application Ser. No. 14/571,992, filed Dec. 16, 2014, the content of which as are hereby incorporated by reference in their entirety.

BACKGROUND

The present disclosure relates to a method for classifying a terrain type in an area. It also relates to a system for classifying a terrain type in an area, to a computer program and a computer program product.

Satellites used for providing pictures of the Earth's surface can often generate multi-spectral images, i.e. the images generated by these satellites can comprise information in different wavelength areas, for example from ultraviolet (UV) to infrared (IR). As an example, the satellites WorldView-2 and WorldView-3 operated by the company DigitalGlobe provide images from eight different spectral bands named coastal blue (400-450 nm), blue (450-510 nm), green (510-580 nm), yellow (585-625 nm), red (630-690 nm), red-edge (705-745 nm), near IR (NIR) 1 (770-895 nm), and NIR2 (860-1040 nm).

The images can be analysed for identifying, for example, water, other terrain types, cities, etc. For identifying water, a water index can be generated for every pixel in the images. In one example the water index is defined by defining a ratio $$W_i^{WV} = \frac{\rho_{coastal\ blue} - \rho_{NIR2}}{\rho_{coastal\ blue} + \rho_{NIR2}}$$

as water index. Here, $\rho NIR2$ denotes the reflectance in the NIR2-spectral band and $\rho coastal\ blue$ denotes the reflectance in the coastal blue-spectral band. A pre-determined threshold for the water index can then determine whether that pixel should be classified as water or not. One reason why the water index above works is that water usually reflects blue wavelengths quite well, whereas NIR-wavelengths usually are reflected only to small amounts. Another example is $$W_i^{GE} = \frac{\rho_{green} - \rho_{NIR}}{\rho_{green} + \rho_{NIR}}$$

defined as a water index. $\rho green$ denotes the reflectance in the green-spectral band and $\rho NIR$ denotes the reflectance in the NIR-spectral band. WiGE can, for example, be used for the GeoEye-1 satellite which has four spectral bands, namely blue, green, red, and near IR (NIR). Also other quantities than the reflectance can be used.

A problem with the existing techniques of classifying areas as containing a certain terrain type, such as water, is that it is difficult to find a threshold which is valid over bigger areas. Typically, it happens that land areas sometimes are mistakenly classified as water. One reason for that is that shadowed areas often can give values for the water index which are on the same side of the threshold as water.

In the US patent application US 2014/0119639 a method for classifying water bodies is presented. First, a normalised difference water index (NDWI) is generated for an area and a segmentation of the area into water-body features and non-water-body features is performed. Then this segmentation is refined by calculating a so called confidence score. This confidence score is calculated via stereo matching of images and denotes how well pixels from different images could be matched together in a stereo matching process. It is assumed that water areas are more difficult to match, which results in that pixels within the water areas in general have much less confidence in a stereo matching procedure than pixels from land areas. A threshold for this confidence can then be determined and pixels originally classified as corresponding to water/non-water can then, depending on which side of the threshold of the confidence score they are, keep or change their status as pixels within/outside water areas.

Performing stereo matching as above puts restraints on the images used in the stereo matching process as they should be taken at the same time of the year for allowing stereo matching, since snow or different appearances of deciduous trees otherwise might make it impossible to find corresponding pixels. Further, stereo matching requires a lot of computational effort.

Although the above examples refer to water, similar problems arise for other kinds of terrain types as well. For these other terrain types similar indices can be defined.

BRIEF SUMMARY

One object of the present disclosure is to provide an improved way of classifying terrain types. Another object of the present disclosure is to provide an alternative way of classifying terrain types.

In one example this has been achieved by a method for classifying a terrain type in an area. The method comprises a step of obtaining a plurality of overlapping aerial images of the area. The method also comprises calculating at least one terrain type index for each part of each of the aerial images which lies in the area, where the at least one terrain type index represents the terrain type. The method also comprises a step of determining at least one effective terrain type index for each part of the area based on the calculated at least one terrain type index for each part of each of the aerial images; and a step of classifying the parts of the area for which at least one pre-determined conditions is met as containing the terrain type, wherein at least one of the at least one predetermined condition relates to a value of the determined at least one effective terrain type index.

By doing this only limited computational power is required since no stereo matching is needed. It is further not required that the images match each other well in their appearance, for example concerning the time of the year on which they were taken, which results in the effect that more images can be used and therefore a more reliable result for the terrain type can be achieved. Since the terrain type index is calculated for each of the plurality of the images, a "wrong" terrain type index in one or a few of the pluralities of the pictures will likely not affect the final classification too much. Problems with shadows are, for example, reduced. This is due to the fact that images in the plurality of the images usually are taken at different times of day and/or different times of the year so that the shadows are at different areas on different images. The shadows in each respective image do not heavily contribute when determining the effective terrain type index. Also other reasons for wrong classification are reduced. Boats, ships, or other moving water-based objects which usually would be classified as small islands will not do so with the present method.

In one example of the method the classified terrain type is water and the at least one terrain type index comprises a water index.

This is especially useful since water areas often are important to recognise since the water areas can preclude different tasks, like being traversed by land-based vehicles, constructing buildings or infrastructure, or the like.

In one example of the method surface elevation data is used to relate the images in the obtained plurality of overlapping aerial images to area data and/or to relate the effective terrain type index to area data. Making this relation is an easy way to assure that a specific part of an image and the determined effective terrain type index relate to a specific part of the area, for example a specific part of the Earth's surface.

In one example of the method the aerial images are images taken from at least one satellite. This allows for easily classifying large areas. Especially if the images are provided from several satellites, a larger amount of images will be available. This will increase the accuracy and/or the reliability of the determined at least one effective terrain type and thus the classification of the area with the terrain type.

In one example the method further comprises a step of calibrating said plurality of aerial images of an area for at least one wavelength band and preferably for all wavelength bands which are used for calculating the at least one terrain type index. This improves the accuracy of the calculated terrain type indices and thus the determined at least one effective terrain type index even further.

In one example of the method the step of determining the at least one effective terrain index for each part of the area comprises using a voting mechanism and/or a statistical method. This is especially useful for removing wrong classifications due to shadows, moving objects, or the like. Further, voting and/or statistical methods are computationally easy to calculate.

In one example the method is used to classify a plurality of terrain types based on a plurality of terrain type indices each representing a specific terrain type. This is useful for many applications like urban planning, infrastructure constructions, or the like.

In one example the method further comprises a step of obtaining surface elevation data of the area, and the at least one pre-determined condition relates also to surface elevation data for the corresponding part of the area. This can improve the classification even further since some terrain types are incompatible with some surface elevation profiles.

In one example the method further comprises a step of obtaining at least one shadow mask. This allows for removing unreliable results from the method and thus provides a method where wrong classifications of the terrain type are even further reduced.

In one example of the method the step of obtaining the at least one shadow mask comprises the step of obtaining for each of the images in the plurality of overlapping aerial images information relating to the position of the sun at the time the image was taken and information relating to the angle from which the image was taken. It further comprises the steps of providing a three-dimensional model of the area and of determining the position of the shadow in each of the images in the plurality of overlapping aerial images based on the provided three-dimensional model of the area, based on the information relating to the position of the sun at the time the image was taken and based on the information relating to the angle from which the image was taken. Using these steps is an efficient way of determining shadows with good accuracy at a reasonable effort. It thus contributes well to the objects of the method.

In one example the terrain type index is only calculated, alternatively only used, for the parts of each of the images in the plurality of overlapping aerial images for which no shadow has been determined. Since terrain type indices in shadowed areas can be unreliable, this has the effect that unreliable results will not influence the classification. By omitting the calculation of unreliable results the method can further be speeded up.

In one example at least some of the objects have been achieved by a computer program comprising a program code for classifying a terrain type in an area. The computer program comprises the step of obtaining a plurality of overlapping aerial images of the area. It further comprises the step of calculating at least one terrain type index for each part of each of the aerial images, where the at least one terrain type index represents the terrain type. It even further comprises the step of determining at least one effective terrain type index for each part of the area based on the calculated at least one terrain type index for each part of each of the aerial images. The computer program also comprises classifying the parts of the area for which at least one pre-determined conditions is met as containing the terrain type, wherein at least one of the at least one predetermined condition relates to a value of the determined at least one effective terrain type index.

In one example at least some of the objects have been achieved by a computer program product comprising a program code stored on a computer readable storage medium for classifying a terrain type in an area. The program code is configured to execute the step of obtaining a plurality of overlapping aerial images of the area. It is further configured to execute the step of calculating at least one terrain type index for each part of each of the aerial images, where the at least one terrain type index represents the terrain type. It is even further configured to execute the step of determining at least one effective terrain type index for each part of the area based on the calculated at least one terrain type index for each part of each of the aerial images. The program code is configured to also execute the step of classifying the parts of the area for which at least one pre-determined conditions is met as containing the terrain type, wherein at least one of the at least one predetermined condition relates to a value of the determined at least one effective terrain type index.

In one example at least some of the objects have been achieved by a system for classifying a terrain type in an area. The system comprises memory means which are arranged to store a plurality of overlapping aerial images of the area. The system also comprises a processing unit which is arranged to calculate at least one terrain type index for each part of each of the aerial images, where the at least one terrain type index represents the terrain type. The processing unit is further arranged to determine at least one effective terrain type index for each part of the area based on the calculated at least one terrain type index for each part of each of the aerial images. The processor unit is even further arranged to classify the parts of the area for which at least one predetermined conditions is met as containing the terrain type, wherein at least one of the at least one predetermined condition relates to a value of the determined at least one effective terrain type index.

In one example of the system the processing unit is further arranged to calibrate said plurality of aerial images of an area for at least one wavelength band and preferably for all wavelength bands which are used for calculating the at least one terrain type index.

In one example of the system the processing unit is further arranged to obtain at least one shadow mask.

In one example of the system surface elevation data of the area is attributed to the plurality of overlapping aerial images of the area, and where the at least one pre-determined condition also relates to surface elevation data for the corresponding part of the area.

The system, the computer program and the computer program product show similar advantages as have been described in relation to the method for classifying a terrain type in an area.

BRIEF DESCRIPTION OF THE FIGURES

The following drawings are intended to better illustrate the principle of the present disclosure. A person skilled in the art will realise that there are many more situations where the disclosure as specified in the claims can be used than can be illustrated in figures. The disclosure should thus not be treated as being limited to the examples specifically shown in the following figures, in which:

DETAILED DESCRIPTION OF VARIOUS EMBODIMENTS

In the following, the description will only focus on water as a terrain type and a water index as a terrain type index. It should, however, be understood that the application of the teaching of this disclosure is not limited to water but applicable to any other terrain type. Examples of other terrain types are rock, forest, agricultural area, constructions, and infrastructure. Terrain type indices can be defined for these other terrain types in a similar way as the water index defined in the background art. The reflectance can be chosen from wavelength band(s) suitable for specifically pointing out the terrain type. Also terrain type indices defined with more than two reflectances or by completely different formulae can be used within the scope of this disclosure.

Figure 1:
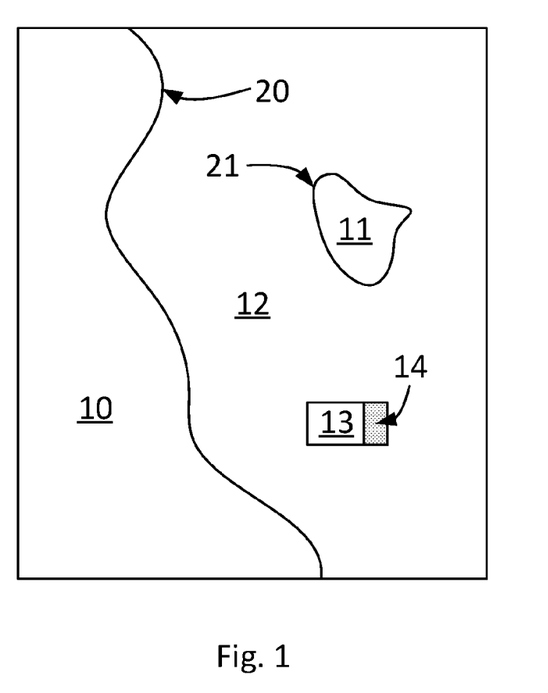
FIG. 1 shows a sketch of an image with a scene.

FIG. 1 shows a sketch of an image 1 with a scene as can be seen when the image is an aerial image. The aerial image can, for example, originate from an airplane, a helicopter, a balloon, an unmanned aerial vehicle (UAV), a satellite, or the like. In the example of image 1 a big lake or a sea 10 with a shoreline 20 is depicted. A land area 12 is on the other side of the shoreline 20 than the big lake or the sea 10. On the land area 12 a building or another construction 13 is shown. This building or construction 13 can give rise to a shadow 14. The position of the shadow 14 depends on the position of the sun. In the illustrated example the sun is situated to the left so that the shadow 14 of the building or the construction 13 is on the side of the building or the construction 13 which is not exposed to the sun. In the example of the image 1 this is the right side of the building or construction 14. In the image 1, a small lake or a pool 11 with a shoreline 21 is depicted as well.

In the image 1 the big lake or the sea 10 and the small lake or the pool 11 are water areas, whereas the land area 12 including the building or construction 13 with its shadow 14 are non-water areas. Based on such an image 1 the aim of the present disclosure is to correctly classify the water areas as water areas and the non-water areas as non-water areas. Especially the shadow 14 is difficult to classify correctly in certain prior art solutions. It should be emphasized that FIG. 1 is only a sketch. In reality images can show much more complex structures. There are, for example, other sources of water areas possible. These other sources can be any of rivers, becks, ditches, water reservoirs, swimming pools, etc. Further, there are other sources of shadows possible like, for example, vegetation, or terrain elevations like mountains, hills, scarps, etc. Even movable objects might be present at an image. Some of these movable objects like ships, boats, platforms, etc. could result in falsely classifying water areas as being non-water areas. How this can be avoided will be described later. The land area itself can be subdivided into many different terrain types like buildings, vegetation, agricultural area, desert, stone/rock, glacier, etc.

Figure 2:
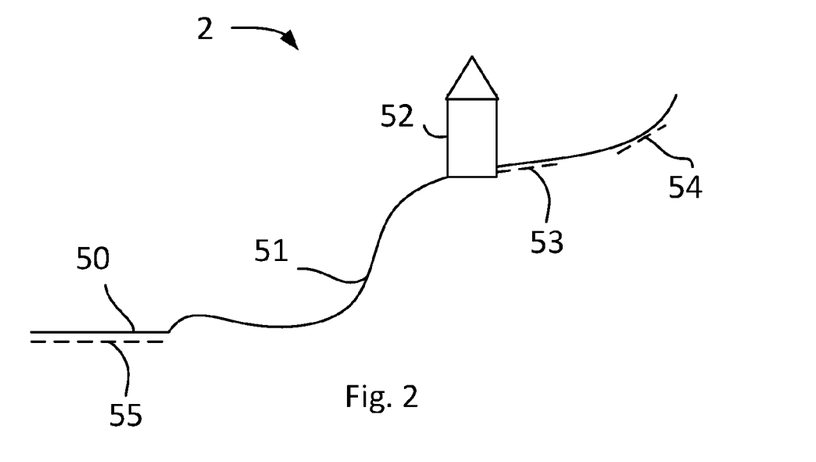
FIG. 2 shows a sketch of a scene.

FIG. 2 shows a sketch of a scene 2. Whereas FIG. 1 shows an aerial image taken "from above", FIG. 2 shows the scene 2 in a side view. The scene comprises a flat water area 50, a land area 51, starting at the end of the water area 50 and continuing with variations in its surface elevation on the right side of the scene 2. The land area 51 is when following it from left to right in FIG. 2 first substantially flat. Then, it rises substantially in the section where the line from the land areas reference number touches the land area. It then turns into a light increasing section on which a building 52 with a roof is constructed and then turns into a more increasing section. In the example of FIG. 2 three areas 53, 54, 55 are classified as water. The area 55 is correctly classified as water, whereas the areas 53 and 54 are incorrectly classified as water. For the area 53 this incorrect classification might originate due to shadows from the building 53. The incorrect classification of the area 54 might originate due to other reasons.

The situations described in relation to FIG. 1 and FIG. 2 provide examples of situations in which the disclosed methods, systems, computer programs, and computer program products for classifying an terrain type in an area can be used.

Figure 3:
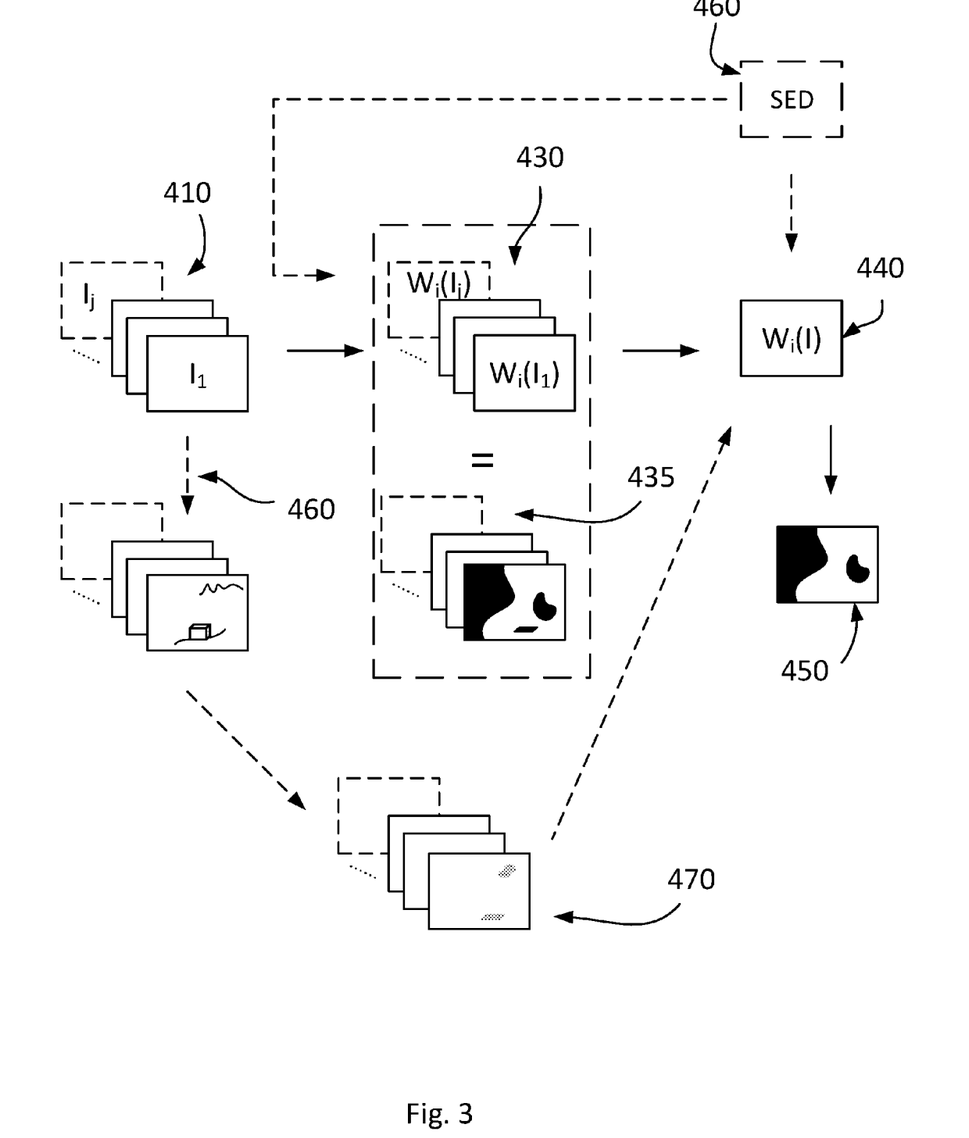
FIG. 3 shows an illustrative sketch of a method according to first embodiments of the present disclosure.

In the following, a method 400 for classifying a terrain type in an area will be described in more detail in relation to FIG. 3 and FIG. 4. The method starts with a step 410 of obtaining a plurality of overlapping aerial images of the area. The aerial images can, for example, originate from an airplane, a helicopter, a balloon, an unmanned aerial vehicle (UAV), a satellite, or the like. If the aerial images are provided from satellites they are especially useful since satellite images usually are available in several wavelength bands as described before, which facilitates calculating terrain type indices. Further, satellite images might provide images over huge areas. The method 400 takes special advantage in case images are taken at different day times and/or times of the year. Also, the method 400 is able to combine images taken at different times of the year. The method 400 shows also special advantages if the images in the plurality of overlapping aerial images are not taken simultaneously. All these occurrences are usually given by satellite images. It should, however, be noted that none of the above named occurrences is a requirement for the method to work, and that all of these occurrences in principle also could be achieved with images taken by other means than satellites. It should also be noted that the method works with images taken by the same satellite, as well as with images taken from different satellites. Thus, in one example, the aerial images are images taken from one satellite. In another example, the aerial images are images taken from different satellites.

Here, and in the whole document, the term plurality of images does refer to different images, i.e. images taken at different times, or from different angles, or by different camera arrangements, or the like. The term does not relate to images which only differ by the wavelength band they use. In the example of the WorldView-2 or WorldView-3 satellites an image from, for example, the NIR2-band and an image from the green-band taken basically simultaneously and showing basically the same area would thus count in the terminology of this paper as one image and not as a plurality of images.

When referring to the term overlapping it should be understood that the images overlap inside the area where the terrain type is classified. In one example every part of the area for which the terrain type is classified is covered by at least two images from the plurality of overlapping aerial images.

Figure 4:
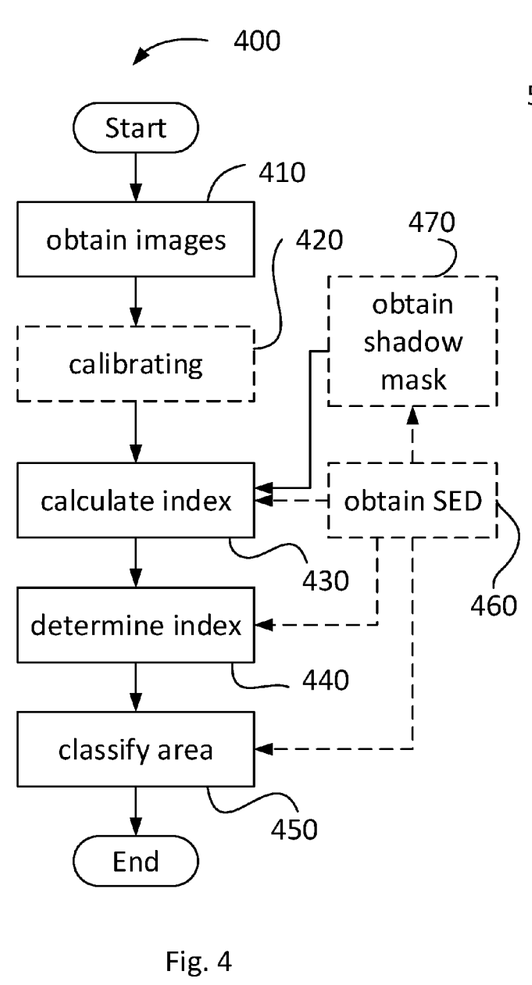
FIG. 4 shows a flow diagram of a method according to second embodiments of the present disclosure.

In one example surface elevation data, SED, is used to relate the images in the obtained plurality of overlapping aerial images to area data (not shown in FIG. 4). This could be the same kind of SED as described later, for example in relation to step 460. The area data comprises in one example two-, or three-dimensional coordinates of the area. The term area does thus not necessarily refer to a flat surface but could in one example include a height dimension as well. In one example, the term relating refers to projecting. In one example the images are thus projected onto a model of the ground, for example a digital elevation model, DEM, or a digital surface model, DSM. By doing this it is assured that a specific part of an image relates to a specific part of the area, for example a specific part of the Earth's surface.

In one example, the term obtaining relates to using images which were taken at a previous time and are stored on some storage device. It is by no means necessary to take images at the time the method 400 is performed. After step 410 the method continues with an optional step 420.

In step 420 images of said plurality of aerial images of an area are calibrated for at least one wavelength band and preferably for all wavelength bands which are used for calculating the at least one terrain type index. In one example this calibration comprises aerosols in the atmosphere and/or angles of the sun. This calibration allows to achieve better results since the information which can be extracted from the images, like the reflectance, is then made directly comparable between the images. This is due to the fact that the calibration can remove or at least greatly reduce influences from the surrounding which affected the image. These influences can for example be properties related to a specific camera arrangement taking one or more of the images in the plurality of overlapping aerial images. It should be stressed that step 420 is optional. The images could, for example, already have been calibrated at an earlier stage. In one example, the images are not calibrated at all. This could, for example, be the case if the information extractable from the images is well suited for comparison and for calculating terrain indices even without calibrating it. After step 420 the method continues with step 430.

In step 430 at least one terrain type index is calculated for each part of each of the aerial images which lies in the area. The at least one terrain type index represents the terrain type. In one example the terrain type is water and the terrain type index is a water index. The term part denotes any suitable subdivision of the image. In one example a terrain type index is calculated for every pixel or group of pixels of the image. In one example a terrain type index is calculated for a group of pixels. As a result, at least one terrain type index is calculated for all parts showing the area of an image of the plurality of the obtained images. This is done for all images out of the obtained plurality of images. Since each of the above named parts of an image corresponds to a part of the area, there will thus generally be different values calculated for the terrain type index of a part of the area. This is due to the fact that the a part in one image and a part in another image, both corresponding to the same part of the area, in general look different due to the different times the images were taken. Especially different times of the year or different times of the day usually influence the appearance of an image. This is due to different appearance of vegetation and different positions of shadows. Also movable objects usually differ between two images. The calculated terrain type indices for each image do in one example allow classifying each image 435 with the terrain type, for example via thresholds.

In one example of step 430 this step comprises a step 460 of obtaining surface elevation data, SED, of the area. In one example this SED is obtained via other sources, for example via a provider of SED. In one example this SED is calculated based on the obtained plurality of overlapping aerial images. When calculating the terrain type index one uses in one example of the method 400 the SED to determine whether a value of the terrain type index is compatible with the SED. In the example of FIG. 2 the area 54 would under some circumstances not be compatible with a water index indicating water since the SED shows an inclining surface. Whereas this would be allowable for becks or rivers, an inclining surface would not be compatible with a lake. If the water index thus shows that an area in the form of a lake or similar is calculated for a part of an image for which the SED shows that this is not possible, one can then mark the value of the water index for this area as not reliable or simply disregard the values for the water index of that area. It should be noted that the values for the water index can be different for different images as described above. This might result in that only the water indices of an area in one or in some images is/are not reliable whereas the water indices of other image(s) can still be reliable and thus used. SED can also be used for other terrain types than water.

In one example the step 430 comprises the step 470 of obtaining at least one shadow mask. This step is described in more detail in relation FIG. 5. After step 430 the method continues with step 440.

In step 440 at least one effective terrain type index is determined for each part of the area based on the calculated at least one terrain type index for each part of each of the aerial images. In other words, the calculated indices for each image, which were calculated in step 430, are used to determine a final at least one terrain type index for each part of the area. As an example, the effective terrain type index of an area A is determined based on the calculated terrain type indices from the parts of the images which correspond to the area A. In one example, step 440 comprises using a voting mechanism and/or a statistical method. The effective terrain type index for a part of the area can for example be determined via taking the statistical average, or a weighted statistical average, of the terrain type indices from the parts of the images corresponding to this part of the area. One example of weighing is shadows of clouds, in case this information is available, since images shadowed by clouds will have other appearances and other reliability than images which are exposed to direct sunlight. Another, or additional, example of weighing is the angle of the sun. In case the sun is directly reflected from the ground into the sensor which takes the images the reliability of the parts of the images causing this reflection is generally quite low. Parts of the images which in the previous step have been determined having a disregarded or unreliable terrain type index are then excluded when taking the average, or at least drastically reduced in their weight. In one example, SED obtained via step 460 is used in step 440. If the determined effective terrain type index is incompatible with the SED for a part of the area, the effective terrain type index for this part of the area can be marked as not reliable or simply be disregarded.

In one example, SED is used to relate the effective terrain type index to the area data. In case the images have not been attributed to specific parts of the area yet, as, for example, described above, the attribution could now be made with the effective terrain type index instead. This means that a specific effective terrain type index, i.e. the effective terrain type index for a specific part of the area, actually is attributed to a specific part of the area.

After step 440 a subsequent step 450 is performed.

In step 450 the parts of the area for which at least one pre-determined condition is met are classified as containing the terrain type, wherein at least one of the at least one predetermined condition relates to a value of the determined at least one effective terrain type index. In one example the at least one pre-determined condition is a threshold of the effective terrain type index. A threshold for the determined at least one effective terrain type index is then used in the following way. Every part of the area having an effective terrain type index above the threshold is classified as containing the terrain type, while every part of the area having an effective terrain type index below the threshold is then classified as not containing the terrain type, or vice versa. In one example, especially when the determined effective terrain type index is an average of the calculated terrain type indices, or has been determined by similar statistical methods or voting mechanism, this has the effect that some calculated terrain type indices being on the "wrong" side of the threshold might be on the average on the "right" side of the threshold, thus reducing the number of wrongful classification. Especially when the step 470 has been used together with step 430 and/or when SED has been used in step 430 and/or step 440, resulting in that parts of the images with incompatible or undeterminable terrain type indices were corrected or disregarded, further resulting in that the contributions of wrongful calculated terrain type indices to the final classification were already drastically reduced in previous steps, this allows an even further improved final classification of the area. In other words, since "wrong" results can already be taken care of in steps 430 and/or step 440, the number of determined effective terrain type indices which are on the "wrong" side of the threshold in step 450 is very low, resulting in an improved classification. Also the influence of movable objects is reduced. Since movable objects usually are not at the same position in different images they will not contribute significantly to the determined effective terrain type index. This is due to the effect that their contribution is eliminated or at least reduced when averaging or voting. As a consequence the influence of these objects is also reduced when classifying the area in step 450, thus further improving right classifications. Especially the influence of ships, boats or other movable water objects will be reduced, thus reducing the probability of wrongfully classifying them as small islands, i.e. non-water areas.

In one example the at least one pre-determined condition relates to the SED. In one example it is checked in step 450 if the classification is compatible with the SED. This is similar to what have been described above. If it is concluded that the classification is not compatible with the SED, the classification is in one example changed. If it, for example, is concluded that a water area in the form of a lake lies on an inclining surface, this area will be changed in its classification from water area to non-water area. Even if SED has already been used in step 430 and/or step 440 and not explicitly again in step 450, the pre-determined condition would still indirectly relate to the SED since the SED has been taken care of in determining the terrain type index.

The method 400 finishes after step 450. In one example the method 400 is used to classify a plurality of terrain types based on a plurality of terrain type indices each representing a specific terrain type. In one example this is done by sequentially running the method 400 for different terrain types. The method 400 can, for example, first be applied to classify the area into water and non-water area. Then, at the next application of the method 400, the non-water area can be classified into area with constructions and area with no construction. Then, the area with no-construction or with construction can be further sub-classified. In another example the different terrain type indices are calculated and determined in parallel, i.e. first the plurality of terrain type indices is calculated in step 430, then the plurality of effective terrain type indices is determined in step 440 and then the parts of the area are classified as containing one of the plurality of terrain types in step 450. When doing the classification in parallel, strategies have to be used to avoid incompatible double-classification. Classifying a part of an area as forest and as water simultaneously would, for example, be not compatible. One such strategy is to define that one classification overrules another classification, for example, that water-classification overrules any other classification.

Figure 5:
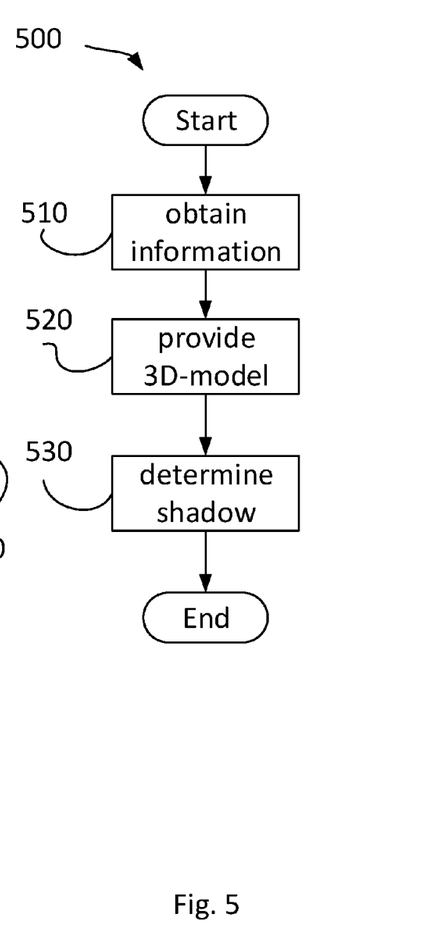
FIG. 5 shows a flow diagram of sub-steps of an optional step according to the present disclosure.

In relation to FIG. 5 a step 500 of obtaining a shadow mask is explained in more detail. This step 500 is in one example performed for every of the at least one shadow masks obtained in step 470.

The step 500 starts with a sub-step 510 of obtaining for each of the images in the plurality of overlapping aerial images information relating to the position of the sun at the time the image was taken and information relating to the angle from which the image was taken. The information relating to the angle from which the image was taken is in one example information relating to at least one of the pitch, yaw and roll angle of the camera arrangement taking the image. In one example the information relates to all of the pitch, yaw and roll angle of the camera arrangement. The information relating to the position of the sun at the time the image was taken is in one example the time and date when the image was taken and the geographical location of the camera arrangement. Knowing this information, it will be possible to determine the position of the sun at the time the image was taken. This is well known in the art and not described here any further. After the sub-step 510, the step 500 continues with the sub-step 520.

In the sub-step 520 a three-dimensional (3D) model of the area is provided. In one example this 3D-model of the area is derived from the SED which is obtained in the optional step 460. In one example the 3D-model is derived from the plurality of overlapping aerial images, for example via stereo matching. In one example a pre-existing 3D-model of the area is used. After sub-step 520 the step 500 continues with sub-step 530.

In sub-step 530 the position of the shadow in each of the images in the plurality of overlapping aerial images is determined based on the provided three-dimensional model of the area, based on the information relating to the position of the sun at the time the image was taken and based on the information relating to the angle from which the image was taken. When knowing the position of the sun and having a 3D-model of the area, one can determine which parts of the areas are covered by shadows which are caused by structures in the area. These structures of the area are for examples buildings, constructions, mountains, hills, trees, etc. The parts of the areas which are in this way determined as being covered by shadow are then determined as being the shadow mask. After sub-step 530 the step 500 finishes.

It should be understood that the above is only an example of how step 500 can be divided into sub-steps. The step 500 has in one example further sub-steps. It is also possible to change order of the sub-steps. Especially the sub-steps 510 and 520 do not depend on each other and can be performed in a different order or in parallel.

The so-determined shadow mask is unique to every image out of the plurality of obtained overlapping aerial images. When performing step 500 for different shadow masks it should, however, be noted that especially the sub-step 520 can be the same for all runs of step 500 and thus usually only needs to be performed once.

In one example of step 430 the terrain type index is only calculated, alternatively only used, for the parts of each of the images in the plurality of overlapping aerial images for which no shadow has been determined. This means in one example that a terrain type index for an image is only calculated for the parts of the image which are not covered by the shadow map which corresponds to the image. In one example the terrain type index for an image is only used for the parts of the image which are not covered by the shadow map which corresponds to the image. The terrain type index is in one example marked as not reliable and/or undeterminable for the parts of an image which are covered by the corresponding shadow map. As an effect, parts of an image which are covered by shadow will not contribute to determining the terrain type index. Instead, only those images where the corresponding part is not covered by shadow will contribute. This has the effect that unreliable results are not used and the determination and finally the classification will only be based on reliable results, thus reducing the number of wrong classifications.

Figure 6:
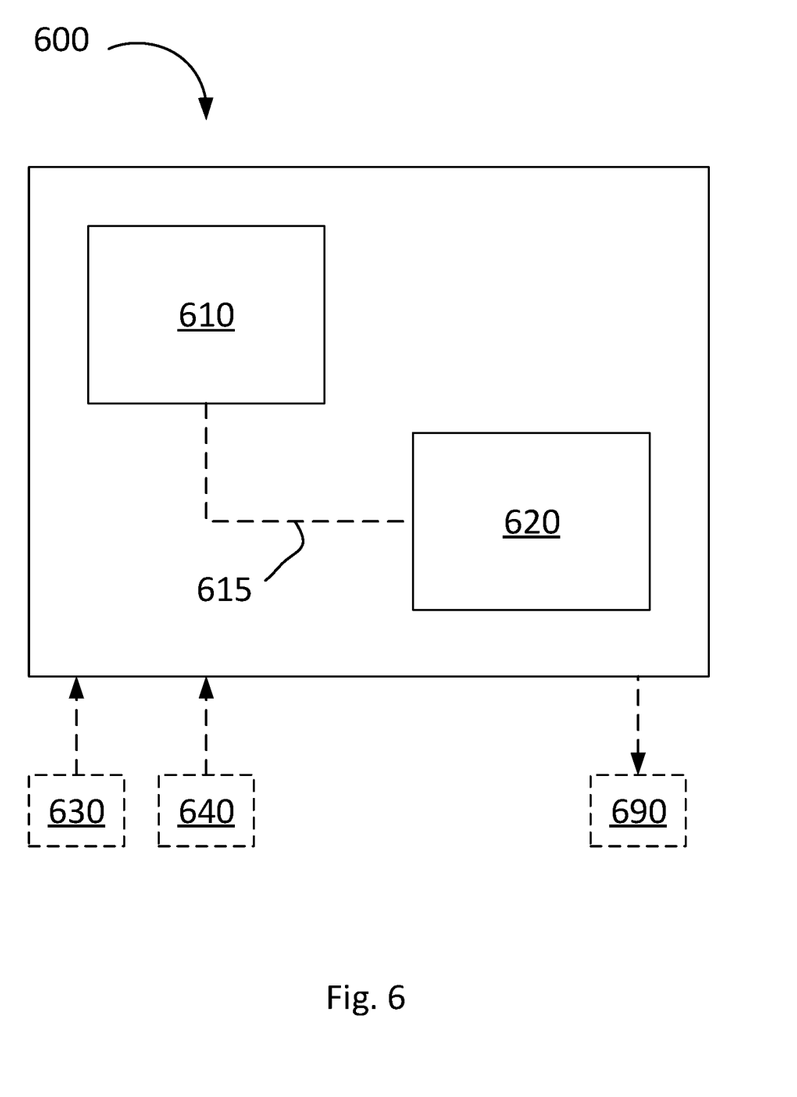
FIG. 6 shows a system for classifying a terrain type according to the present disclosure.

FIG. 6 depicts schematically a system 600 for classifying a terrain type in an area. The system 600 comprises memory means 610 and a processing unit 620.

Here, and in the whole document the term link relates to any kind of link allowing the transmission of information. In one example the link is a wireless link. In one example the link is a physical link, for example a link comprising at least one wire or at least one fibre.

The memory means 610 are arranged to store a plurality of overlapping aerial images of the area. This plurality of the overlapping aerial images can be obtained as described in relation to step 410. In one example the plurality of the overlapping aerial images is provided to the memory means 610 via image providing means 630. These image providing means 630 comprise in one example at least one camera arrangement. In one example the image providing means 630 comprise an image archive. In one example the memory means 610 are also arranged to store information relating to the position of the sun at the time the image was taken and information relating to the angle from which the image was taken. This information is in one example according to what is described in relation to step 510. This information is in one example provided via the image providing means 630.

In one example the memory means are further arranged to store information relating to SED and/or relating to a 3D-model. This information is in one example provided via SED and/or 3D-model providing means 640.

The processing unit 620 is arranged to calculate at least one terrain type index for each part of each of the aerial images, where the at least one terrain type index represents the terrain type. This can be done according to what is described in step 430. The processing unit is further arranged to determine at least one effective terrain type index for each part of the area based on the calculated at least one terrain type index for each part of each of the aerial images. This can be done according to what is described in relation to step 440. The processor unit 620 is even further arranged to classify the parts of the area for which at least one pre-determined conditions is met as containing the terrain type, wherein at least one of the at least one predetermined condition relates to a value of the determined at least one effective terrain type index. This can be done according to what is described in relation to step 450.

In one example the system 600 comprises a link 615 between the processor unit and the memory means. This link allows transmission of information between the processor unit 620 and the memory means 610.

In one example the processing unit 620 is further arranged to calibrate said plurality of aerial images of an area for at least one wavelength band and preferably for all wavelength bands which are used for calculating the at least one terrain type index. This can be preferably done in a way described in relation to step 420. In one example the processing unit 620 is further arranged to obtain at least one shadow mask. In one example of the system 600 information relating to the classification of the area is transmitted to an output device 690. In one example the output device 690 is a displaying unit. In one example the output device is a storage arrangement. The communication between the system 600 and the output device 690, the SED and/or 3D-model providing means 640 and/or the image providing means 630 is in one example arranged to be performed via links.

The present disclosure relates also to a computer program comprising a program code for classifying a terrain type in an area. It also relates to a computer program product comprising a program code stored on a computer readable storage medium for classifying a terrain type in an area. In one example the computer program comprises any of the steps of the method described above. In one example the program code is configured to execute any of the steps of the method as described above. In one example the computer program product is a non-transitory computer program product. In one example the computer readable storage medium is a non-transitory computer readable storage medium.

When referring to surface elevation data, SED, in this disclosure it should be understood that this expression also relates to Digital Elevation Models, DEM, or Digital Surface Models, DSM. DEM and DSM should thus in the scope of this disclosure be treated as equivalents to SED and as being covered by the expression SED.

The invention claimed is:
1. A method for classifying a terrain type in an area, the method comprising the steps of:
  obtaining a plurality of overlapping aerial images of the area, wherein the plurality of overlapping aerial images are not images that only differ by a wavelength band that each aerial image out of the plurality of overlapping aerial images uses:

calculating at least one terrain type index for each part of each of the aerial images which lies in the area, where the at least one terrain type index represents the terrain type;

determining at least one effective terrain type index for each part of the area based on the calculated at least one terrain type index for the corresponding part of each of the overlapping aerial images, the effective terrain type index for each part of the area being determined via taking either a statistical average or a weighted statistical average of corresponding terrain type indices from each corresponding part of each of the overlapping aerial images, which correspond to this part of the area: and classifying the parts of the area for which at least one predetermined conditions is met as containing the terrain type, wherein at least one of the at least one predetermined condition relates to a value of the determined at least one effective terrain type index.

2. The method according to claim 1, where the classified terrain type is water and where the at least one terrain type index comprises a water index.

3. The method according to claim 1, wherein surface elevation data is used at least one of to relate the images in the obtained plurality of overlapping aerial images to area data or to relate the effective terrain type index to area data.

4. The method according to claim 1, wherein the overlapping aerial images are images taken from at least one satellite.

5. The method according to claim 1, further comprising a step of calibrating said plurality of aerial images of an area for at least one wavelength band and preferably for all wavelength bands which are used for calculating the at least one terrain type index.

6. The method according to claim 1, further comprising a step of calibrating said plurality of aerial images of an area for all wavelength bands which are used for calculating the at least one terrain type index.

7. The method according to claim 1, wherein the step of determining the at least one effective terrain type index for each part of the area comprises using at least one of a voting mechanism or a statistical method.

8. The method according to claim 1, wherein the method is used to classify a plurality of terrain types based on a plurality of terrain type indices each representing a specific terrain type.

9. The method according to claim 1, further comprising a step of obtaining surface elevation data of the area, and where the at least one pre-determined condition also relates to surface elevation data for the corresponding part of the area.

10. The method according to claim 1, further comprising a step of obtaining at least one shadow mask.

11. The method according to claim 10, wherein the step of obtaining said at least one shadow mask comprises the steps of:

obtaining for each of the images in the plurality of overlapping aerial images information relating to the position of the sun at the time the image was taken and information relating to the angle from which the image was taken;

providing a three-dimensional model of the area;

determine the position of the shadow in each of the images in the plurality of overlapping aerial images based on the provided three-dimensional model of the area, based on the information relating to the position of the sun at the time the image was taken and based on the information relating to the angle from which the image was taken.

12. The method according to claim 10, wherein said terrain type index is only calculated for the parts of each of the images in the plurality of overlapping aerial images for which no shadow has been determined.

13. The method according to claim 10, wherein said terrain type index is only used for the parts of each of the images in the plurality of overlapping aerial images for which no shadow has been determined.

14. A computer program comprising at least one non-transitory computer-readable storage medium having computer-readable program code for classifying a terrain type in an area embodied therein, the computer-readable program code being configured to execute the steps of:

obtaining a plurality of overlapping aerial images of the area, wherein the plurality of overlapping aerial images are not images that only differ by a wavelength band that each aerial image out of the plurality of overlapping aerial images uses:

calculating at least one terrain type index for each part of each of the aerial images which lies in the area, where the at least one terrain type index represents the terrain type;

determining at least one effective terrain type index for each part of the area based on the calculated at least one terrain type index for the corresponding part of each of the overlapping aerial images, the effective terrain type index for each part of the area being determined via taking either a statistical average or a weighted statistical average of corresponding terrain type indices from each corresponding part of each of the overlapping aerial images, which correspond to this part of the area: and classifying the parts of the area for which at least one predetermined conditions is met as containing the terrain type, wherein at least one of the at least one predetermined condition relates to a value of the determined at least one effective terrain type index.

15. A system for classifying a terrain type in an area, the system comprising:

one or more memory storage areas configured to store a plurality of overlapping aerial images of the area, wherein the plurality of overlapping aerial images are not images that only differ by a wavelength band that each aerial image out of the plurality of overlapping aerial images uses:

calculate at least one terrain type index for each part of each of the aerial images which lies in the area, where the at least one terrain type index represents the terrain type;

determine at least one effective terrain type index for each part of the area based on the calculated at least one terrain type index for the corresponding part of each of the overlapping aerial images, the effective terrain type index for each part of the area being determined via taking either a statistical average or a weighted statistical average of corresponding terrain type indices from each corresponding part of each of the overlapping aerial images, which correspond to this part of the area: and classify the parts of the area for which at least one predetermined conditions is met as containing the terrain type, wherein at least one of the at least one predetermined condition relates to a value of the determined at least one effective terrain type index.

16. The system according to claim 15, wherein the processing unit further is configured to calibrate said plurality of aerial images of an area for at least one wavelength band used for calculating the at least one terrain type index.

17. The system according to claim 15, wherein the processing unit further is configured to calibrate said plurality of aerial images of an area for all wavelength bands used for calculating the at least one terrain type index.

18. The system according to claim 15, wherein the processing unit further is configured to obtain at least one shadow mask.

19. The system according to claim 15, wherein:
surface elevation data of the area is attributed to the plurality of overlapping aerial images of the area, and
the at least one pre-determined condition also relates to surface elevation data for the corresponding part of the area.

* * * * *